(12) United States Patent
Edmunds et al.

(10) Patent No.: US 8,826,120 B1
(45) Date of Patent: *Sep. 2, 2014

(54) SYSTEMS AND METHODS FOR IDENTIFYING RENDERING ISSUES ACROSS ELECTRONIC DOCUMENT VIEWERS

(75) Inventors: Randall Edmunds, San Diego, CA (US); Lori Hylan-Cho, Philadelphia, PA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/030,365

(22) Filed: Feb. 18, 2011

Related U.S. Application Data (63) Continuation of application No. 11/585,000, filed on Oct. 23, 2006, now Pat. No. 7,895,514.

(51) Int. Cl.
 *G06F 17/00* (2006.01)
(52) U.S. Cl.
 USPC .......................... 715/234; 715/236; 715/237
(58) Field of Classification Search
 CPC ........................ G06F 17/271; G06F 17/2247
 USPC ................................................ 715/234–237
 See application file for complete search history.

(56) References Cited

U.S. PATENT DOCUMENTS

| | | | |
|---|---|---|---|
| 7,185,007 B2 | 2/2007 | Yagi | |
| 7,281,205 B2 | 10/2007 | Brook | |
| 7,895,514 B1 | 2/2011 | Edmunds et al. | |
| 2001/0013043 A1 | 8/2001 | Wagner | |
| 2001/0054048 A1* | 12/2001 | Kelsey | 707/513 |
| 2002/0035580 A1* | 3/2002 | Tanabe | 707/513 |
| 2002/0073080 A1 | 6/2002 | Lipkin | |
| 2003/0120686 A1* | 6/2003 | Kim et al. | 707/200 |
| 2003/0233620 A1* | 12/2003 | Vedullapalli et al. | 715/522 |
| 2004/0017391 A1 | 1/2004 | Druyan et al. | |
| 2004/0148568 A1* | 7/2004 | Springer | 715/513 |
| 2004/0205163 A1* | 10/2004 | Yagi | 709/219 |
| 2004/0205588 A1 | 10/2004 | Purvis et al. | |

(Continued)

FOREIGN PATENT DOCUMENTS

JP      2007164645 A   *  6/2007

OTHER PUBLICATIONS

Liam Quinn, "Web Design Group-CSSCheck, CSSCheckup, and CSSCheck Results", 1997-2005, pp. 1-3.*

(Continued)

*Primary Examiner* — Chau Nguyen
(74) *Attorney, Agent, or Firm* — Kilpatrick Townsend & Stockton LLP (57) ABSTRACT

Identification and correction of rendering problems that occur when a document (e.g., a web page) is displayed by a document viewer (e.g., web browser) are described. In one exemplary embodiment, a web page has a first element written in a markup language and a second element written in a style sheet language. A method includes receiving a command at a development environment, analyzing a structure of an electronic document responsive to the command, the electronic document having a first element written in a first computer language and a second element written in a second computer language, identifying a relationship between the first and second elements, wherein the relationship causes a rendering problem associated with a document viewer, and presenting information to the user about the rendering problem via the development environment.

21 Claims, 5 Drawing Sheets

(56) References Cited

U.S. PATENT DOCUMENTS

| | | | |
|---|---|---|---|
| 2005/0102628 A1 | | 5/2005 | Salesin et al. |
| 2006/0174195 A1 | | 8/2006 | White |
| 2006/0236223 A1 | | 10/2006 | Aubert et al. |
| 2007/0028164 A1 | * | 2/2007 | Kawanishi ............... 715/515 |
| 2007/0174118 A1 | | 7/2007 | Dekel et al. |
| 2008/0077855 A1 | * | 3/2008 | Lev et al. ............... 715/236 |
| 2008/0320343 A1 | | 12/2008 | Eickmeyer et al. |
| 2009/0235159 A1 | * | 9/2009 | Hosoda ............... 715/235 |

OTHER PUBLICATIONS

Cascading Style Sheets, Web Design Group, available at http://htmlhelp.com/reference/css, last accessed Aug. 4, 2010.

Web Authoring Tools, Web Design Group, available at http://htmlhelp.com/tools, last accessed Aug. 4, 2010.

Wikipedia, lint(software), available at http://en.wikipedia.org/wiki/Lint_(software), last accessed Aug. 4, 2010.

\* cited by examiner

SYSTEMS AND METHODS FOR IDENTIFYING RENDERING ISSUES ACROSS ELECTRONIC DOCUMENT VIEWERS

CROSS-REFERENCE TO RELATED APPLICATION AND PRIORITY CLAIM

The present application is a continuation of U.S. patent application Ser. No. 11/585,000, filed Oct. 23, 2006, now U.S. Pat. No. 7,895,514, which is incorporated by reference herein in its entirety.

TECHNICAL FIELD

The present invention relates, in general, to computer software, and, more specifically, to solving rendering compatibility problems across electronic document viewers.

BACKGROUND

The World Wide Web (WWW) contains web pages that use both Hyper-Text Markup Language (HTML) and Cascading Style Sheets (CSS). Over the past several years, HTML has become the predominant markup language for the creation of web pages. It describes the structure and style of text-based information in a document and supplements that text with forms, embedded images, and other objects. Meanwhile, CSS is a popular style sheet language used to describe the presentation (e.g., colors, fonts, layout, etc.) of documents written in markup language. By using HTML and CSS together, web designers are able to advantageously separate a document's structure and content (written in markup language) from its presentation formatting (written in style sheet language).

Generally speaking, web pages are viewed using web browsers. Web browsers interpret HTML and CSS elements of a web page, and render the web page to a user. There are many web browsers available today, including, for example, Microsoft Corp.'s INTERNET EXPLORER®, Mozilla Corp.'s FIREFOX®, Opera Software ASA's OPERA®, Netscape Communications Corp.'s NETSCAPE®, and Apple Computer Corp.'s SAFARI®, among others. When creating web pages, designers frequently use validation tools that automatically check HTML and CSS code for invalid tags, attributes, or values. Such validation tools are sometimes included in application development environments such as, for example, Adobe Systems Inc.'s DREAMWEAVER® and GOLIVE®.

Unfortunately, the lack of coding errors does not guarantee pixel-perfect rendering across all browsers. In fact, certain rendering problems involve complex relationships between HTML elements and CSS properties. As a result, even after HTML and CSS code is otherwise validated, different web browsers may still render or display the same web page differently.

SUMMARY

Various representative embodiments of the present invention are related to systems, methods, and computer program products for identifying and correcting rendering problems that occur when an electronic document is displayed on different viewing platforms. As such, embodiments of the present invention allow users operating different document viewers to have similar or identical experiences when viewing the same document. For instance, an electronic document may comprise a first element written in a first computer language and a second element written in a second computer language. According to one exemplary embodiment of the present invention, a method may comprise parsing the document to identify rendering problems or bugs caused by a particular relationship between the first and second elements when the document is processed by a specific document viewer. Some of the embodiments described herein may be implemented as stand-alone software or may be integrated within other software, such as, for example, a document editor or a software development environment.

In another representative embodiment, an electronic document may be a web page and a document viewer may be a web browser. The web page may contain both markup and style sheet elements. Markup elements may be written in any markup language now existing or yet to be developed, including, for example, HTML, Extensible HTML (XHTML), Standard Generalized Markup Language (SGML), Extensible Markup Language (XML), or the like. Style sheet elements may be written in any style sheet language, such as, for example, CSS, Document Style Semantics and Specification Language (DSSSL), Formatted Output Specification Instance (FOSI), or the like.

Thus, a method may comprise parsing the web page to find combinations of markup structures and style sheet formatting that may result in rendering bugs when the web page is viewed using a specific web browser. The method may also comprise alerting a web designer about the rendering problem and/or providing the designer with information about how to fix the problem. The method may further comprise providing a link to an external information service or site that contains information about the rendering bug. At least some of these steps may be implemented as stand-alone software or may be integrated, for example, within a web page editor such as Adobe Systems Incorporated's DREAMWEAVER™.

One of the many advantages of the various representative embodiments of the present invention is that they allow a document author or web designer to assure the uniform presentation of documents or web pages across different document viewers or web browsers. The present invention also allows authors and designers to refine existing compatibility checks and to define new checks. Furthermore, by performing the compatibility procedures described herein, the invention allows authors and designers to shorten development time and reduce costs.

The foregoing has outlined rather broadly certain features and technical advantages of the present invention so that the detailed description that follows may be better understood. Additional features and advantages are described hereinafter. As a person of ordinary skill in the art will readily recognize in light of this disclosure, specific embodiments disclosed herein may be utilized as a basis for modifying or designing other structures for carrying out the same purposes of the present invention. Such equivalent constructions do not depart from the spirit and scope of the invention as set forth in the appended claims. Several inventive features described herein will be better understood from the following description when considered in connection with the accompanying figures. It is to be expressly understood, however, the figures are provided for the purpose of illustration and description only, and are not intended to limit the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

In the following description, reference is made to the accompanying drawings that form a part hereof, and in which exemplary embodiments of the invention may be practiced by way of illustration. These embodiments are described in sufficient detail to enable any person of ordinary skill in the art to practice the invention, and it is to be understood that other embodiments may be utilized, and that changes may be made, without departing from the spirit of the present invention. The following description is, therefore, not to be taken in a limited sense, and the scope of the present invention is defined only by the appended claims.

Figure 1:
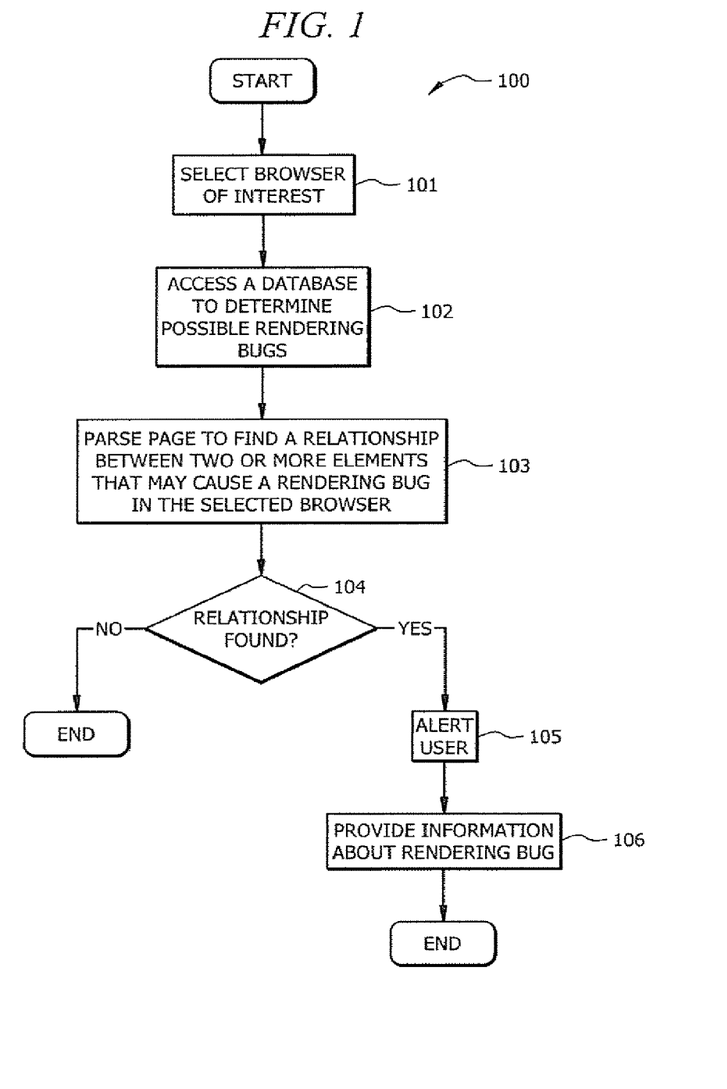
FIG. 1 is a flowchart of a method for identifying browser rendering problems according to one embodiment of the present invention.
Figure 2:
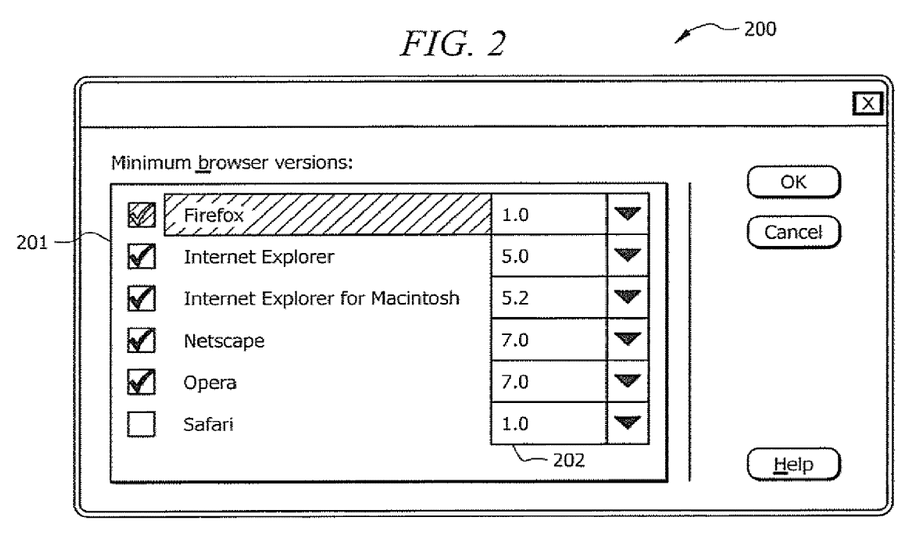
FIG. 2 is a screenshot illustrating a browser selection window according to one embodiment of the present invention.

Turning now to FIG. 1, a flowchart of method 100 for identifying browser rendering problems is depicted according to one exemplary embodiment of the present invention. In step 101, a user is allowed to define a set of browsers of interest. In one exemplary embodiment, the user may interact with method 100 via a graphical user interface (GUI) of an application development environment. For instance, as illustrated in screenshot 200 of FIG. 2, the user may select a set of browsers to be checked from list 201, and also the minimum version of each browser using drop-down boxes 202. As such, method 100 may check browser compatibility for each supported browser, starting from the selected version up until the latest available version. In one embodiment, each browser presented in list 202 may have an associated profile within a configuration folder. In this manner, users may extend and add other browsers to be checked by method 100, by creating or setting different profiles in the configuration folder.

After the user has selected at least one browser of interest, method 100 accesses a database to determine possible rendering bugs associated with the selected browser in step 102. As described below with respect to FIGS. 3 and 4, the database of step 102 may be a local database, a remote database, or a combination of local and remote databases. Next, method 100 parses a document to find a relationship between two or more of the document's elements that may cause a rendering bug in the browsers previously selected in step 103. In the case where the document is a web page, method 100 may look for relationships between HTML elements and CSS properties that cause rendering issues, rather than merely identifying the lack of support for individual CSS properties or HTML elements alone. Particularly, rendering bugs may be caused by any combination of elements such as HTML tag names, HTML tag attribute values, CSS declared or computed property values, and the like. Further, these conditions may exist on the element itself or on a parent, child, sibling, ancestor, or descendent of the element. Therefore, step 103 analyzes the interaction between HTML structures or relationships (e.g., consecutive block-level elements, inline replaced elements inside block-level elements, nested containers, etc.) and combinations of CSS properties or values wherever they may appear in the cascaded page code. As a result, step 103 is capable of discovering combinations of elements that may trigger browser rendering issues.

The parsing algorithm used in step 103 may be coded, for example, in Netscape Communications Corp.'s JAVASCRIPT® using application program interface (API) calls. However, as a person of ordinary skill in the art will readily recognize in light of this disclosure, the algorithms and functions disclosed herein may be written in any other programming language, such as, for example, C, C++, Sun Microsystems Inc.'s JAVA®, Perl, etc. In one embodiment, a parsing algorithm defines combinations of CSS declarations and computed properties of specific page elements, as well as their parents, children, siblings, etc. Detection of particular combinations of structure and formatting may be handled, for example, in a JAVASCRIPT® extensibility layer. As such, a JAVASCRIPT® function may search the user's document or web page for bug-triggering relationships between HTML elements and CSS properties by examining the document object model (DOM) to extract the computed and/or declared styles of each element.

According to certain embodiments of the present invention, a set of JAVASCRIPT® API calls may be created to search within a document for relationships among elements that may result in a rendering bug. Thus, a JAVASCRIPT® routine may be coded for each rendering bug with instructions about where to look for particular issues. For example, some rendering bugs may require parsing of the entire structure of a document, including the root document, all children elements, and all the children's children. Meanwhile, other bugs may only apply, for example, to image tags. In that case, the JAVASCRIPT® code may retrieve a list of all the images in the document and then go through the list linearly checking any properties that may cause the rendering bug. For example, a set of JAVASCRIPT® functions may define each rendering bug, have a short name, a long description, a list of browsers that can be affected, and may further include a "find issue" function that actually parses through the structure of the HTML and the CSS definitions.

In one embodiment, additional and/or missing properties or other conditions that may prevent a rendering bug from occurring may also be considered to reduce the chance of false positives. In another embodiment, step 103 may further employ style filtering, for example, in the core C++ code, thus causing styles that are visible to the JAVASCRIPT® layer to change based upon how a browser would parse the particular style sheets and interpret values given to each property. Style filtering emulates or mimics an individual browser's understanding of style values and may allow method 100 to view CSS code, thus allowing the user to determine whether rendering bugs associated with that browser have been eliminated.

Table I, depicted below, illustrates an exemplary, non-limiting list of rendering issues or bugs that may be identified using method 100. Table I also shows, for each rendering bug, a description of the combination of HTML and CSS elements that causes the bug, the browsers (and versions) affected by the problem, and a proposed solution.

TABLE I

| Rendering Bug | Description | Browsers | Solution(s) |
|---|---|---|---|
| Expanding box | Any content that does not fit in a fixed-width or height box may cause the box to expand to fit the content (the content should | Internet Explorer (IE)/ Windows (Win) | Use "word-wrap: break-word" inside IE- conditional comments (works on |

TABLE I-continued

| Rendering Bug | Description | Browsers | Solution(s) |
|---|---|---|---|
| | overflow instead). Boxes with no specific width also expand. In this case, the "overflow:hidden" workaround does not apply. If the expansion is desirable, the same effect can be achieved in standards-compliant browsers by applying "display: table-cell" to the container | | text only) or "overflow: hidden" (works on text, images, etc. but causes content to be clipped). |
| Disappearing list/background bug | If a list (dl, ol, ul) with a background is placed within a floated, relatively-positioned div, the background may not render as specified. | IE/Win | Relatively-position all lists. Add "ul, ol, dl {position: relative;}" to the style sheet. |
| Guillotine bug | If a container element has both a float that is not cleared and links that use an "a:hover" rule to change certain properties (e.g., background, padding, text style, and border; not text color) in non-floated content after the float, hovering over the links may cause the bottom of the floated content to disappear. | IE/Win | Two options: [1] Use a clearing div outside the container when the float should not be contained; or [2] use a combination of ":after" a hack to create a clearing element within the container when the float should be contained |
| Doubled float margin bug | When a margin is applied to a floated box on the same side as the direction the box is floated and the floated box is the first one inside its containing box, the margin is doubled | IE/Win | Specify "display:inline" for the affected float. |
| Buttons lose button shape when floated | float applied to "<button>" causes the button background to disappear, leaving only the text | Opera versions 7 and 8 | Use "<input type = "button">" instead. |
| Disappearing dropdown in lists | When a floated list with overflow:auto contains a "<select>" dropdown, the dropdown disappears when changing its value (Mozilla) or never appears at all (Explorer Macintosh) | Firefox version 1 and IE/Mac | Do not set both "overflow" and "float" on the list. Rather, wrap list in container and apply one of the properties to the container |
| "COL" and "COLGROUP" captured by "CAPTION" | If the "<caption>" tag is placed directly after the opening "<table>" tag as required by the HTML spec, "COL" and "COLGROUP" are no longer accessible selectors. | Safari version 2.0.3 | Move the "<caption>" tag after the "<col>" and "<colgroup>" tags, though this will cause the page to fail validation. |

Again, the list of rendering issues or bugs presented in Table I above are provided by means of example only, and do not limit the scope of the present invention. As a person of ordinary skill in the art will readily recognize in light of this disclosure, an unlimited number of rendering issues other than those explicitly discussed herein may be discovered and/or corrected using the systems and methods of the present invention.

For each web browser selected by the user, step 103 may re-cascade styles according to style filters available for that browser. As step 103 calls each find issue function, each call may return a different style for a different browser. Accordingly, if certain rendering issues affect more than one browser, step 103 may call the same find issue function more than once. After the proper style filter is applied to the web page, a find issue function then searches for specific a combination of HTML and CSS elements that may cause a rendering bug in that browser.

If step 104 confirms that rendering bug has been detected, the user is notified in step 105. Finally, method 100 provides information regarding any rendering bugs found in step 106. For example, the user may be notified through an interface such as the one depicted in FIG. 3, which shows a screenshot of parsing results 300 according to one exemplary embodiment of the present invention. File tree window 306 shows a list of folders and files that may be tested for rendering issues. Browser compatibility check tab 301 comprises window 302 having a list of instances of potential bugs discovered along with a reference to each line of the page's underlying code that may be causing the bug. In one embodiment, different confidence levels are also reported (e.g., 100%, 75%, 50%, 25%) indicating the accuracy of the bug detection. Browser compatibility check tab 301 also shows a short description 303 of the of the rendering bug selected in window 302 along with link 305, which provides more information about the selected rendering bug in window 304.

Figure 3:
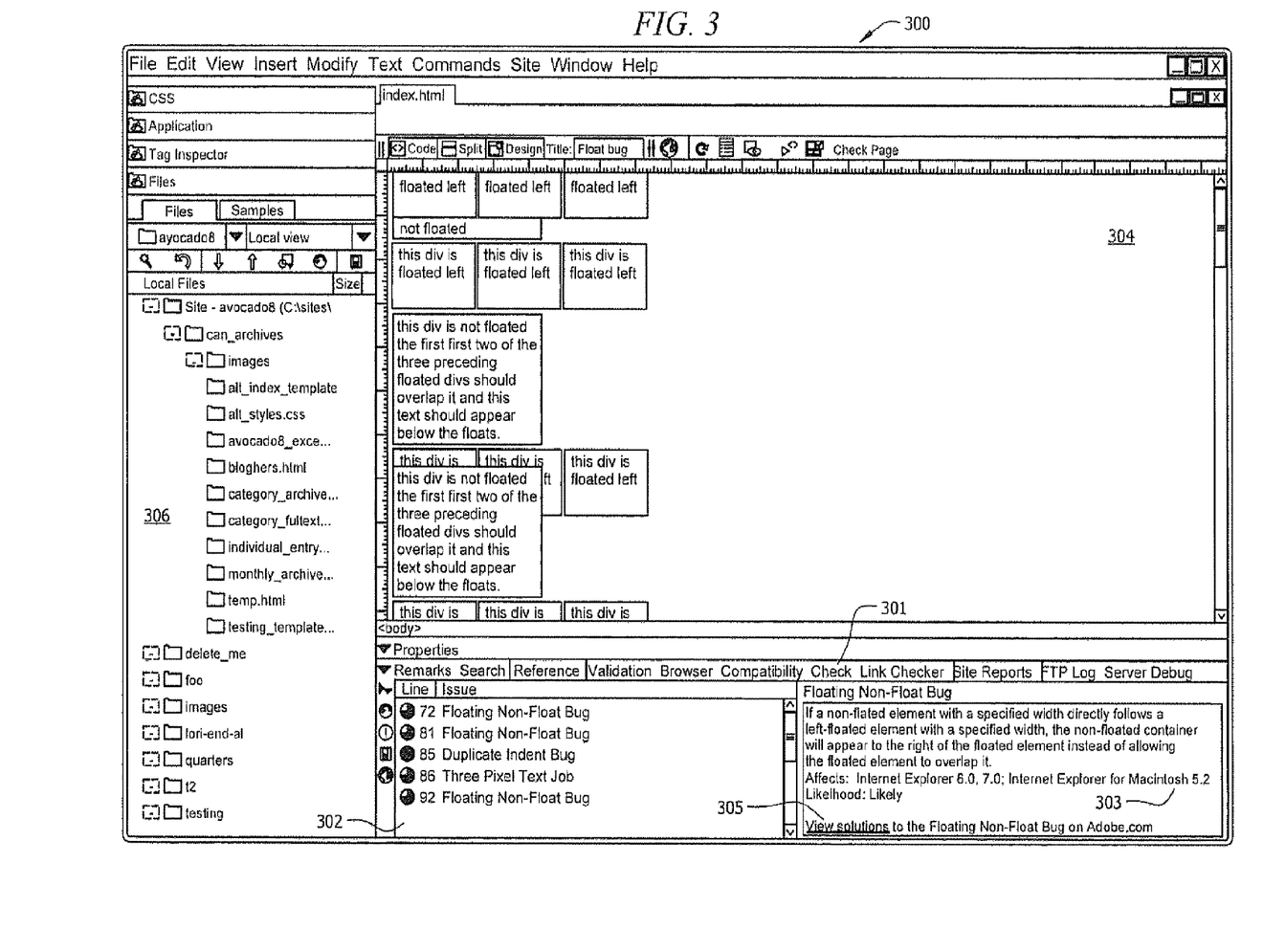
FIG. 3 is a screenshot illustrating a presentation of results according to one embodiment of the present invention.

In one embodiment, a user may follow link 305 to a remote knowledge database that provides more details about the problem and possible solutions. The remote knowledge database may be, for example, a collaborative web site set up to allow user editing and adding of content (often referred to as a "wiki"), so that other users may identify new issues and provide more information about the rendering problem and possible solutions or workarounds. Authors and designers may check a web page after problems are reported, or proactively check the web page before posting it to the web. Authors and designers may also code new rendering conditions as new web browsers and updated versions are released, and may check for conditions that have been added by other users.

Figure 4:
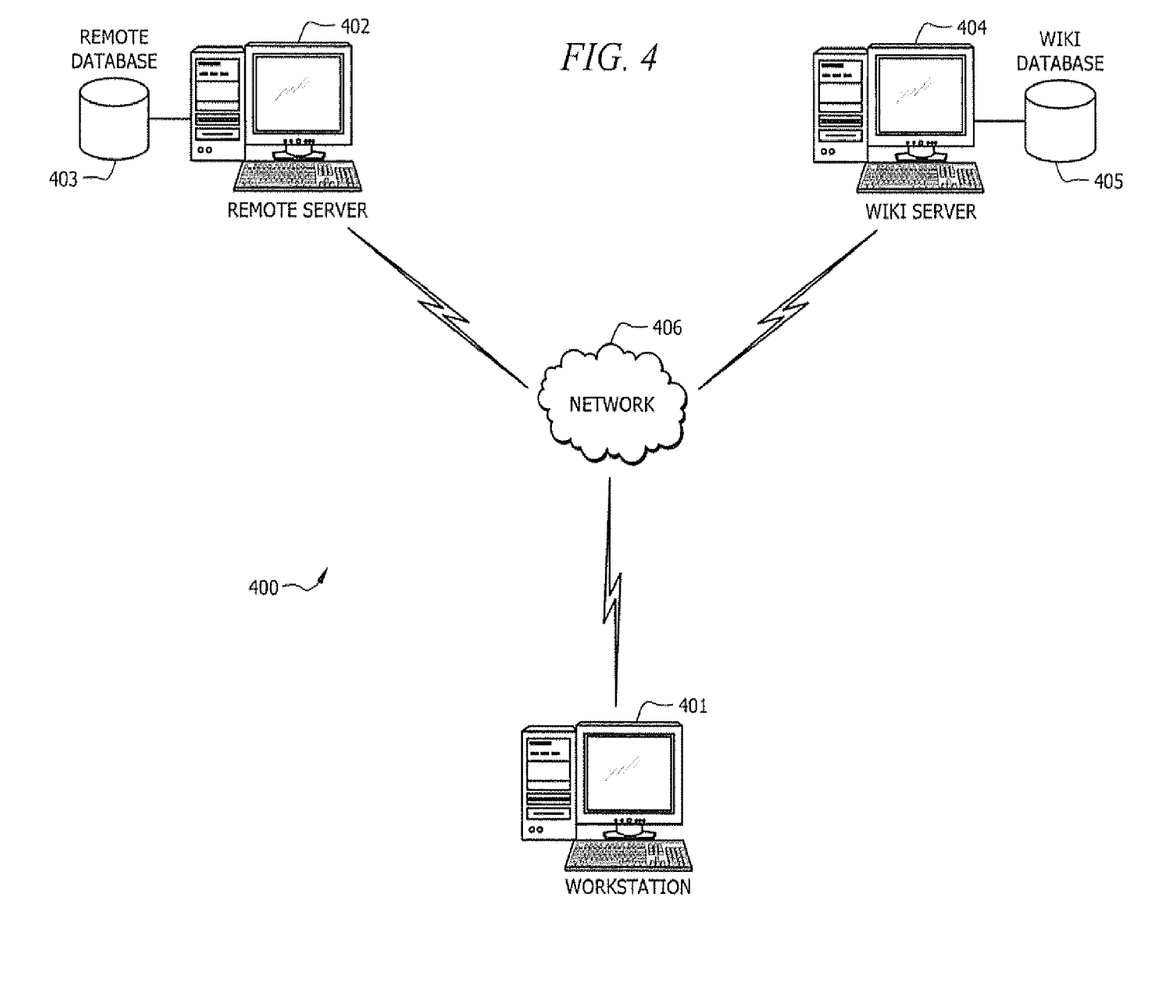
FIG. 4 is a diagram of a system for checking browser compatibility according to one embodiment of the present invention.

FIG. 4 shows a diagram of system 400 for checking browser compatibility according to one exemplary embodiment of the present invention. A web designer or document author creates a web page or document using workstation 401, which is connected to network 406. Network 406 may be, for example, the Internet. After creating the web page or document, the web designer or document author executes a software program that implements method 100 as described above. Workstation 401 receives software updates from remote server 402 having remote database of rendering issues 403 through network 406. Alternatively or additionally, a software program of workstation 401 provides a connection to wiki server 404 having a wild database of rendering problems and suggested workarounds 405.

As previously noted, some of the functions and/or algorithms described above may be implemented, for example, in software or as a combination of software and human implemented procedures. Software may comprise computer executable instructions stored on computer readable media such as memory or other type of storage devices. Further, functions may correspond to modules, which may be software, hardware, firmware or any combination thereof. Multiple functions may be performed in one or more modules as desired, and the embodiments described are merely examples. Software may be executed on a digital signal processor, ASIC, microprocessor, or other type of processor operating on a computer system, such as a personal computer, server or any other computer system.

The software, computer program, or code segments making up the various embodiments of the present invention may be stored in a computer readable medium. The term "computer readable medium" includes any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, and the like. Code segments may be downloaded via computer networks such as the Internet, Intranet, or the like.

Figure 5:
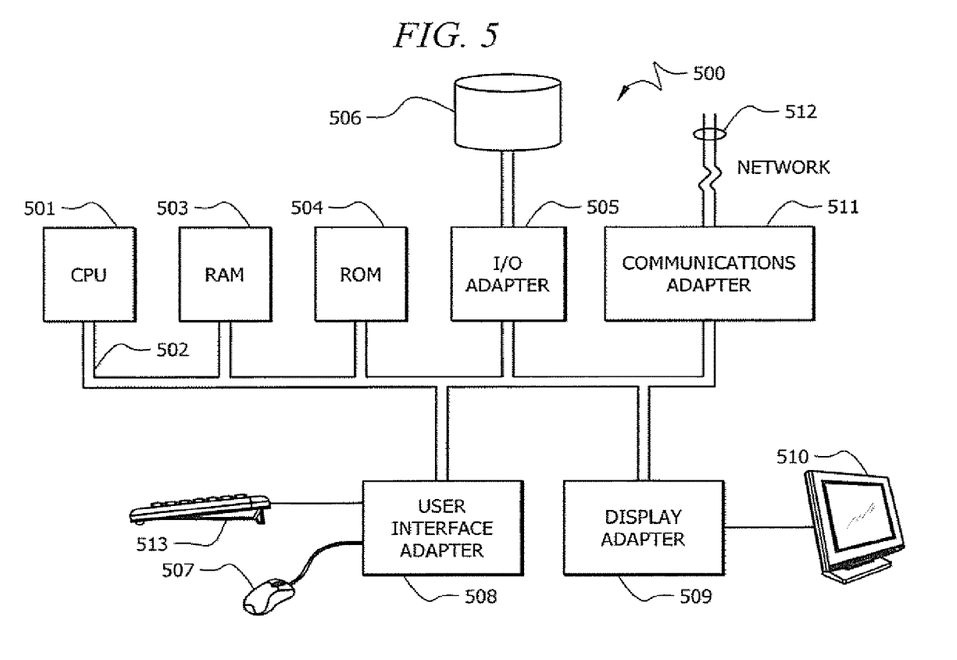
FIG. 5 illustrates a computer system adapted for use with embodiments of the present invention.

FIG. 5 illustrates computer system 500 adapted to use embodiments of the present invention (e.g., storing and/or executing software associated with the embodiments). Central processing unit (CPU) 501 is coupled to system bus 502. CPU 501 may be any general purpose CPU. However, embodiments of the present invention are not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM.

Bus 502 is also coupled to input/output (I/O) controller card 505, communications adapter card 511, user interface card 508, and display card 509. I/O adapter card 505 connects storage devices 506, such as one or more of a hard drive, a CD drive, a floppy disk drive, a tape drive, to computer system 500. I/O adapter 505 is also connected to a printer (not shown), which would allow the system to print paper copies of information such as documents, photographs, articles, and the like. The printer may be a printer (e.g., dot matrix, laser, and the like), a fax machine, scanner, or a copier machine. Communications card 511 is adapted to couple the computer system 500 to network 512, which may be one or more of a telephone network, a local (LAN) and/or a wide-area (WAN) network, an Ethernet network, and/or the Internet. User interface card 508 couples user input devices, such as keyboard 513, pointing device 507, and the like, to computer system 500. Display card 509 is driven by CPU 501 to control the display on display device 510.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the process, machine, manufacture, means, methods, and steps described herein. As a person of ordinary skill in the art will readily appreciate from this disclosure, other processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

What is claimed:

1. A method comprising:
   accessing, by a computing device, a document comprising a markup element;
   identifying, by a computing device, a combination of the markup element and a style element applied to the markup element, the combination known to cause one or more rendering issues when the document is rendered by a target application, wherein the identified combination is specified using correct syntax;
   parsing the document to determine whether the document includes the identified combination; and
   responsive to a determination that the document includes the identified combination, providing, by the computing device, information about the one or more rendering issues associated with the identified combination.

2. The method of claim 1, wherein determining whether the document includes the identified combination comprises:
   extracting computed and declared styles of the markup element; and
   emulating the target application's processing of the markup element.

3. The method of claim 1, further comprising
   providing output to present about the one or more rendering issues, the information retrieved at least in part from a remote database.

4. The method of claim 1, wherein the target application comprises a browser.

5. The method of claim 1, wherein the document comprises a web page.

6. The method of claim 1, wherein identifying and providing are carried out by an application used to edit the document.

7. The method of claim 6, wherein the application comprises a development environment.

8. The method of claim 1, wherein the markup element and the style element of the document can be interpreted and rendered by the target application and an additional target application, and wherein the additional target application does not cause the one or more rendering issues when the document is rendered by the additional target application.

9. A device, comprising:
   a non-transitory computer-readable medium; and
   a processing element configured to:
   access a document from the non-transitory computer-readable medium,
   determine a target rendering application for rendering the document,
   parse the document to identify a markup element in the document and a style applied to the markup element known to cause a rendering issue when the document is rendered by the target rendering application, wherein the markup element and the style applied to the element are specified using correct syntax, and wherein the target rendering application is configured to interpret the markup element and the style applied to the markup element; and
   provide information about the rendering issue associated with the identified markup element in the document and the style applied to the markup element.

10. The device of claim 9, wherein the processing element comprises a processor configured by software stored in the non-transitory computer-readable medium.

11. The device of claim 9, wherein the target rendering application comprises a web browser.

12. The device of claim 11, wherein the document comprises a web page.

13. The device of claim 9, wherein the style is defined in at least one of the document or a separate document referenced by the document.

14. The device of claim 9, wherein the target rendering application comprises a target browser version.

15. A computer program product comprising a non-transitory computer-readable medium embodying program code, the program code comprising:

code for identifying a combination of a markup element in a document and a style element applied to the markup element, the combination known to cause one or more rendering issues when the document is rendered by a target application, wherein the identified combination is specified using correct syntax;

code for parsing the document to determine whether the document includes the identified combination; and responsive to a determination that the document includes the identified combination, code for providing information about the one or more rendering issues associated with the identified combination.

16. The computer program product of claim 15, wherein determining whether the document includes the identified combination comprises:

extracting computed and declared styles of the markup element; and emulating the target application's processing of the markup element.

17. The computer program product of claim 15, wherein the target application comprises a browser.

18. The computer program product of claim 15, wherein the document comprises a web page.

19. The computer program product of claim 15, further comprising program code for displaying the document.

20. The computer program product of claim 15, wherein the code for identifying accesses the style element from the document or a style sheet document referenced by the document.

21. The computer program product of claim 15, wherein the target application comprises a target browser version.

* * * * *